United States Patent
Bowman et al.

(10) Patent No.: US 8,274,917 B1
(45) Date of Patent: Sep. 25, 2012

(54) RECOGNITION OF USERS BY ASSIGNED SOURCE PORT BLOCKS

(76) Inventors: Chris Bowman, Round Rock, TX (US); Frank Sheiness, Austin, TX (US)

( * ) Notice: Subject to any disclaimer, the term of this patent is extended or adjusted under 35 U.S.C. 154(b) by 320 days.

(21) Appl. No.: 12/790,774

(22) Filed: May 28, 2010

(51) Int. Cl.
H04L 12/28 (2006.01)
(52) U.S. Cl. .......................... 370/254; 370/401
(58) Field of Classification Search .................. 370/252, 370/254, 255, 389, 392, 400, 401
See application file for complete search history.

(56) References Cited

U.S. PATENT DOCUMENTS

| | | | |
|---|---|---|---|
| 5,799,016 A * | 8/1998 | Onweller | 370/401 |
| 2002/0141352 A1 * | 10/2002 | Fangman et al. | 370/254 |
| 2002/0150083 A1 * | 10/2002 | Fangman et al. | 370/352 |
| 2005/0190755 A1 * | 9/2005 | Singh et al. | 370/389 |

* cited by examiner

Primary Examiner — Hong Cho

(57) ABSTRACT

Recognition of users by assigned source port blocks identifies a specific network-attached device using date, time, WAN IP, and source port information associated with a user session. The method includes the steps of: receiving a date, time, WAN IP address, and source port associated with a user session; a computer searching a list of user sessions for one or more LAN IP addresses associated with the received WAN IP address that were in use at the received date and time; responsive to finding one or more matching IP addresses, a computer searching a list of assigned source ports for a match between a set of source ports assigned with the found LAN IP addresses and the received source port; and responsive to finding a matching source port, a computer identifying a source host device that is assigned the matching LAN IP address.

18 Claims, 4 Drawing Sheets

RECOGNITION OF USERS BY ASSIGNED SOURCE PORT BLOCKS

BACKGROUND OF THE INVENTION

1. Field of the Invention

The present invention relates to a method of recognition of users by assigned source port blocks for use in connection with computer networks. The method of recognition of users by assigned source port blocks has particular utility in connection with identifying a specific network-attached device using date, time, WAN IP, and source port information associated with a user session.

2. Description of the Prior Art

The method of recognition of users by assigned source port blocks is desirable for identifying a specific network-attached device using date, time, WAN IP, and source port information associated with a user session. The Digital Millennium Copyright Act (DMCA) gives Internet service providers "safe harbor" from claims of copyright infringement if they cooperate with copyright owners' attempts to protect their intellectual property, in most cases by informing subscribers of violations and by terminating "repeat offenders." But many providers that serve multifamily dwelling unit (MDU) residents through a bandwidth over subscription model use Network Address Translation (NAT) instead of public IP addresses to identify their subscribers. Hosts on the local area network (LAN) associated with the MDU are assigned a private Internet Protocol (IP) address by a router using Dynamic Host Configuration Protocol (DHCP). Each LAN IP is mapped to a Wide Area Network (WAN) IP address on the router. Multiple LAN IPs are mapped to a single WAN IP to conserve WAN IP space. When traffic is sent from a host on the LAN, a source port from 1 to 65535 is randomly assigned to keep track of that user session.

If a destination host wishes to discover the identity of a local user who is believed to have committed copyright infringement, the destination host may provide all the information it has about the offending session, including the date, time, WAN IP address, and source port, to the local service provider. However, the session cannot be narrowed down to a specific device by the service provider given the basic information available to the destination host; it can only be narrowed down to the entire block of LAN IPs assigned to the WAN IP. Without some other means of identification, it is usually very difficult to identify specific abuser unless he or she has a public IP address. When the service provider gets a DMCA notification for copyright infringement taking place on its public IP addresses, its ability to find a specific abuser will usually end at the DHCP server. This exposes the service provider to potential liability for the violation.

Therefore, a need exists for a new and improved recognition of users by assigned source port blocks that can be used for identifying a specific network-attached device using date, time, WAN IP, and source port information associated with a user session. In this regard, the present invention substantially fulfills this need. In this respect, the recognition of users by assigned source port blocks according to the present invention substantially departs from the conventional concepts and designs of the prior art, and in doing so provides a method primarily developed for the purpose of identifying a specific network-attached device using date, time, WAN IP, and source port information associated with a user session.

SUMMARY OF THE INVENTION

In view of the foregoing disadvantages inherent in the known types of user recognition using session information available from a destination host now present in the prior art, the present invention provides an improved recognition of users by assigned source port blocks, and overcomes the above-mentioned disadvantages and drawbacks of the prior art. As such, the general purpose of the present invention, which will be described subsequently in greater detail, is to provide new and improved recognition of users by assigned source port blocks which has all the advantages of the prior art mentioned heretofore and many novel features that result in a recognition of users by assigned source port blocks which is not anticipated, rendered obvious, suggested, or even implied by the prior art, either alone or in any combination thereof.

To attain this, the present invention essentially comprises the steps of: receiving a date, time, WAN IP address, and source port associated with a user session; a computer searching a list of user sessions for one or more LAN IP addresses associated with the received WAN IP address that were in use at the received date and time; responsive to finding one or more matching IP addresses, a computer searching a list of assigned source ports for a match between a set of source ports assigned with the found LAN IP addresses and the received source port; and responsive to finding a matching source port, a computer identifying a source host device that is assigned the matching LAN IP address.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached. A computer program product and a system for recognition of users by assigned source port blocks are also disclosed.

Numerous objects, features, and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved method of recognition of users by assigned source port blocks that has all of the advantages of the prior art and none of the disadvantages.

Still another object of the present invention is to provide a new method of recognition of users by assigned source port blocks that provides in the apparatuses and methods of the prior art some of the advantages thereof, while simultaneously overcoming some of the disadvantages normally associated therewith.

Even still another object of the present invention is to provide a method of recognition of users by assigned source port blocks for identifying a specific network-attached device using date, time, WAN IP, and source port information associated with a user session. This allows a session to be narrowed to a specific device.

Still yet another object of the present invention is to provide a method of recognition of users by assigned source port blocks for identify a specific network-attached device using date, time, WAN IP, and source port information associated with a user session. This makes it possible to provide discrete, publicly identifiable network addresses using Network Address Translation.

An additional object of the present invention is to provide a method of recognition of users by assigned source port blocks for identify a specific network-attached device using date, time, WAN IP, and source port information associated with a user session. This enables service providers to meet DMCA notification requirements using an order of magnitude fewer public IP addresses.

Lastly, it is an object of the present invention to provide a new and improved method of recognition of users by assigned source port blocks for identify a specific network-attached device using date, time, WAN IP, and source port information associated with a user session.

These together with other objects of the invention, along with the various features of novelty that characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figure 1:
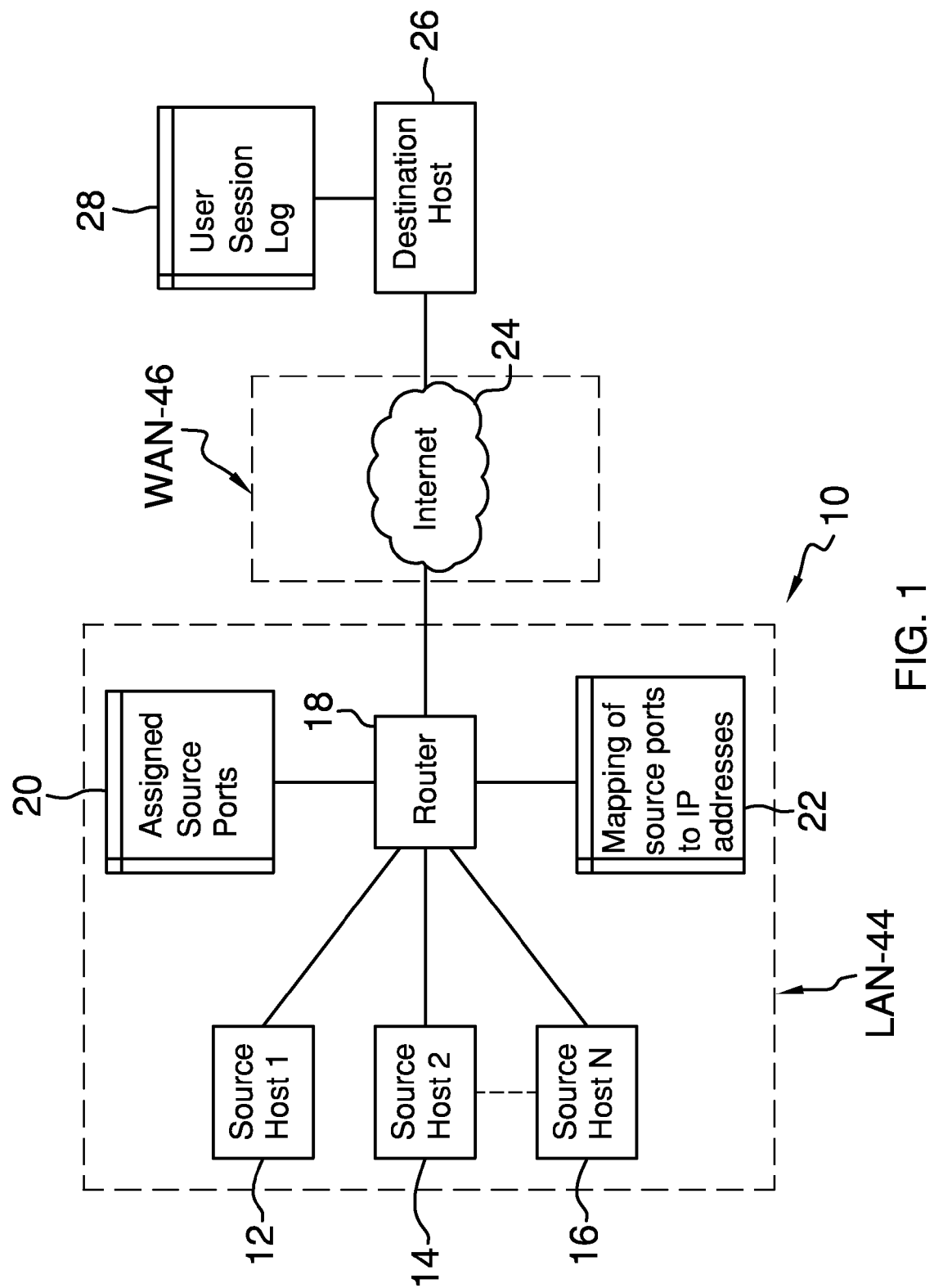
FIG. 1 is a block diagram of the current embodiment of a computer network constructed in accordance with the principles of the present invention.

Referring now to the drawings, and particularly to FIGS. 1-5, a current embodiment of the method of recognition of users by assigned source port blocks of the present invention is shown and generally designated by the reference numeral 200.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be stored in the memory of and provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In FIG. 1, a computer network 10 suitable for use with the new and improved method of recognition of users by assigned source port blocks of the present invention for identifying a specific network-attached device using date, time, WAN IP, and source port information associated with a user session is illustrated and will be described. More particularly, the computer network 10 has multiple source hosts 1-N (12-16) connected to a router 18 to form a LAN 44. The router 18 may include a DHCP server function, or there may be a separate DHCP server connected to the router. Each source host has a LAN IP address assigned to it by the DHCP server. Each LAN IP address is mapped to a WAN IP address on the router. Multiple LAN IP addresses may be mapped to a single WAN IP address to conserve WAN IP address space. The router maintains a list of assigned source port ranges by LAN IP address and a mapping of source ports to IP addresses 22. The router is connected to the Internet 24. A destination host 26 is also connected to the Internet, together forming a WAN 46. The destination host maintains a user session log 28.

Figures 2, 3:
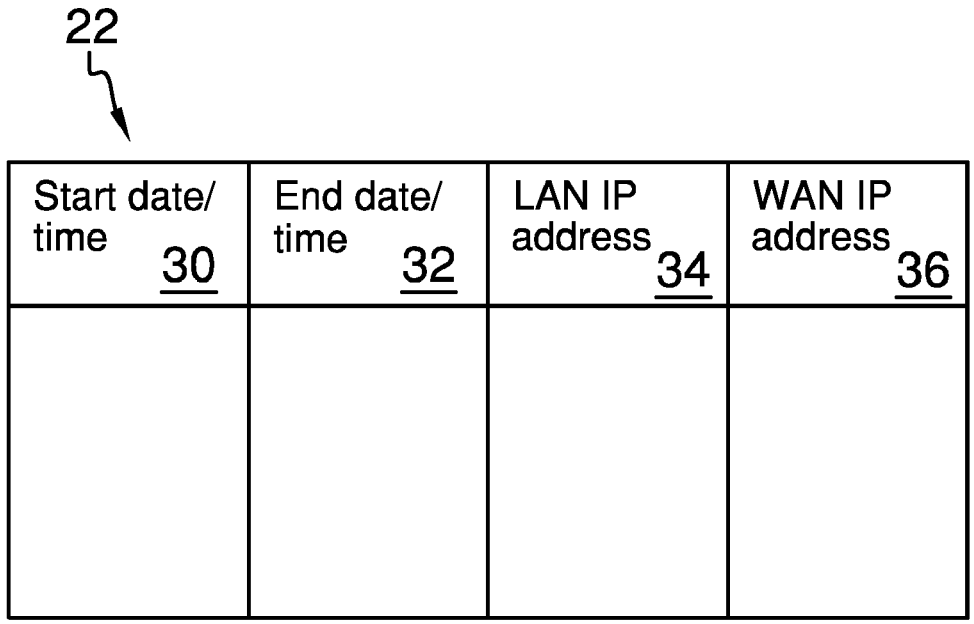
FIG. 2 is a block diagram of the mapping of source ports to IP addresses suitable for use with the method of recognition of users by assigned source port blocks of the present invention.
FIG. 3 is a block diagram of the list of assigned source port ranges by LAN IP address suitable for use with method of recognition of users by assigned source port blocks of the present invention.

Moving on to FIG. 2, a new and improved mapping of source ports to IP addresses 22 suitable for use with the method of recognition of users by assigned source port blocks of the present invention for identifying a specific network-attached device using date, time, WAN IP, and source port information associated with a user session is illustrated and will be described. More particularly, the mapping of source ports to IP addresses 22 has a start date/time 30, end date/time 32, LAN IP address 34, and a WAN IP address for each user session initiated by a host device with the router. The router captures all the information required to populate the mapping of source ports to IP addresses and records it in the mapping of source ports to IP addresses at the beginning and end of each user session.

Continuing with FIG. 3, a new and improved list of assigned source ports 20 suitable for use with the method of recognition of users by assigned source port blocks of the present invention for identify a specific network-attached device using date, time, WAN IP, and source port information associated with a user session is illustrated and will be described. More particularly, the list of assigned source ports 20 has a pre-determined set of source ports 40 on each WAN IP address 48 assigned to a specific mapped LAN IP address 38. The set of source ports for a given LAN IP address may be any nonoverlapping subset ranging from 1 to 65535.

Figure 4:
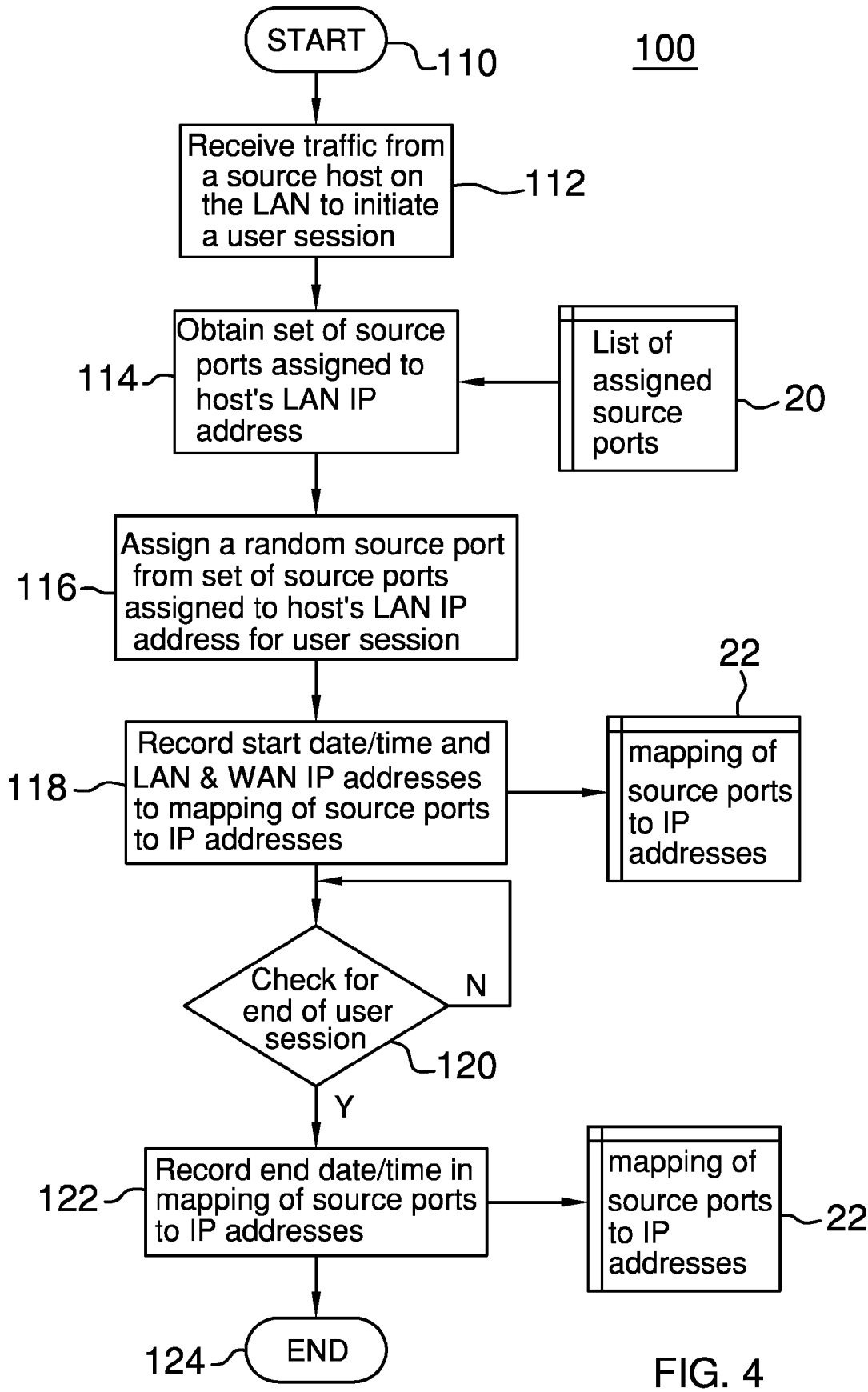
FIG. 4 is a flowchart of the method of recognition of users by assigned source port blocks of the present invention.

In FIG. 4, a new and improved method of populating the mapping of source ports to IP addresses 100 is illustrated and will be described. More particularly, the method 100 populates the mapping of source ports to IP addresses 22 so that a specific device associated with a user session can be identified later. The method begins (110) by the router 18 receiving traffic from a source host 12, 14, or 16 on the LAN to initiate a user session (112). The router consults the list of assigned source ports 20 to obtain the set of source ports 40 assigned to the source host's LAN IP address 38 (114). The router then assigns a random source port from the range of source ports for use during the source host's user session (116). The router records the start date/time 30, source host's LAN IP address 34, and WAN IP address 36 in the mapping of source ports to IP addresses 22 (118). The router routes traffic between the source host and one or more destination hosts 26 over the Internet 24 while checking for the end of the user session (120) until the user session has ended. Once the user session has ended, the router records the end date/time 32 for the user session in the mapping of source ports to IP addresses 22 (122) prior to the conclusion of the method (124).

Figure 5:
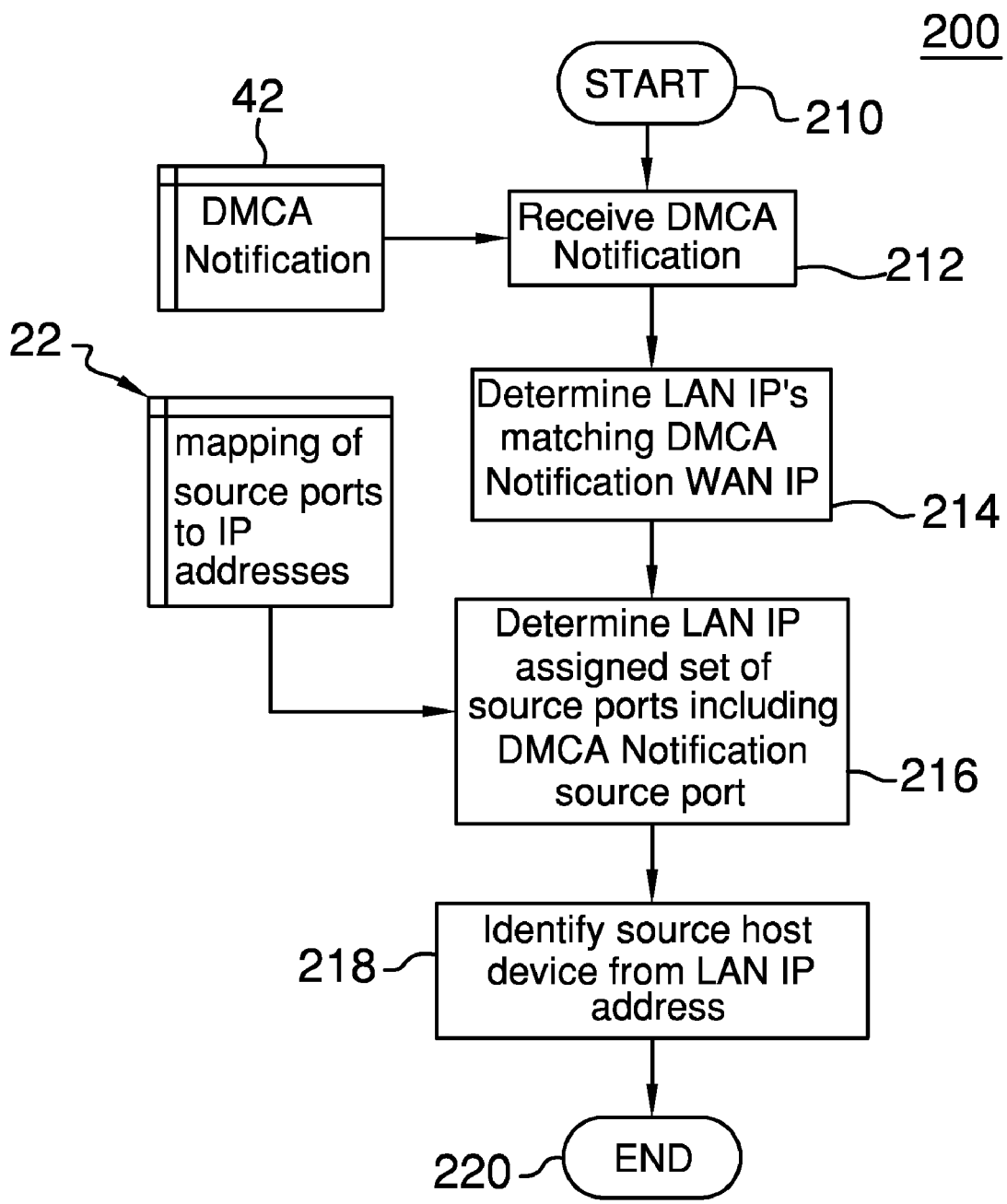
FIG. 5 is a flowchart of the method of recognition of users by assigned source port blocks of the present invention.

Concluding with FIG. 5, a new and improved method of recognition of users by assigned source port blocks 200 of the present invention for identifying a specific network-attached device using date, time, WAN IP, and source port information associated with a user session is illustrated and will be described. More particularly, the method 200 is initiated (210) in response to receiving a DMCA copyright infringement notification 42 (212). The DMCA notification includes the date, time, WAN IP address and source port associated with the offending user session. The mapping of source ports to IP addresses 22 is consulted by the service provider to determine the LAN IP addresses associated with the WAN IP address from the notification that were in use at the time of the infraction (214). The mapping of source ports to IP addresses 22 is then consulted by the service provider to determine which LAN IP address was assigned a set of source ports that included the source port in use at the time of the infraction (216). The service provider can then use the specific LAN IP address that was identified to identify the source host device that was the source of the infraction (218) prior to the termination of the method (220), such as by MAC address. A computer may be used to match the data contained in a DCMA copyright infringement notification with data contained in the mapping of source ports to IP addresses 22 to identify a specific source host device.

While a current embodiment of the recognition of users by assigned source port blocks has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of recognition of users by assigned source port blocks comprising the steps of:
   a computer receiving data associated with a user session;
   a computer searching a mapping of source ports to Internet protocol addresses for one or more local area network Internet protocol addresses associated with a received wide area network Internet protocol address that were in use at a received date and time;
   responsive to finding one or more local area network Internet protocol addresses associated with the received wide area network Internet protocol address that was in use at the received date and time, a computer searching a list of assigned source ports for a match between a set of source ports associated with the found local area network Internet protocol addresses and a received source port; and
   responsive to finding a match between the set of source ports associated with the found local area network Internet protocol addresses and the received source port, a computer identifying a source host device that is assigned the matching local area network Internet protocol address.

2. The method of claim 1, wherein the received data associated with a user session comprises a date, time, wide area network Internet protocol address, and source port.

3. The method of claim 1, wherein the mapping of source ports to Internet protocol addresses comprises list of user sessions, each having a start date, a start time, an end date, an end time, a local area network Internet protocol address, and a wide area network Internet protocol address.

4. The method of claim 1, wherein responsive to receiving traffic from a source host having a local area network Internet protocol address to initiate a user session, a computer searching the list of assigned source ports for a range of source ports assigned to the local area network Internet protocol address, responsive to finding a range of source ports assigned to the local area network Internet protocol address, a computer assigning a random source port from the range of source ports for use during the source host's user session, a computer recording the start date, start time, source host's local area network Internet protocol address, and the source host's wide area network Internet protocol address in the mapping of source ports to IP addresses, and responsive to the ending of the user session, a computer recording the end date and end time in the mapping of source ports to IP addresses.

5. The method of claim 4, wherein at least one of the computers is a router.

6. The method of claim 1, wherein the received data associated with a user session were obtained from a user session log recorded by a destination host computer.

7. A computer program product for recognition of users by assigned source port blocks comprising:
   a computer readable medium;
   first program instructions to search a mapping of source ports to Internet protocol addresses for one or more local area network Internet protocol addresses associated with a received wide area network Internet protocol address that were in use at a received date and time responsive to receiving data associated with a user session;

second program instructions to search a list of assigned source ports for a match between a set of source ports associated with the found local area network Internet protocol addresses and a received source port responsive to finding one or more local area network Internet protocol addresses associated with the received wide area network Internet protocol address that was in use of the received date and time; and third program instructions to identify a source host device that is assigned the matching local area network Internet protocol address responsive to finding a match between the set of source ports associated with the found local area network Internet protocol addresses and the received source port.

8. The product of claim 7, wherein the received data associated with a user session comprises a date, time, wide area network Internet protocol address, and source port.

9. The product of claim 7, wherein the mapping of source ports to Internet protocol addresses comprises list of user sessions, each having a start date, a start time, an end date, an end time, a local area network Internet protocol address, and a wide area network Internet protocol address.

10. The product of claim 7, further comprising program instructions to search the list of assigned source ports for a range of source ports assigned to the local area network Internet protocol address responsive to receiving traffic from a source host having a local area network Internet protocol address to initiate a user session, to assign a random source port from the range of source ports for use during the source host's user session responsive to finding a range of source ports assigned to the local area network Internet protocol address, to record the start date, start time, source host's local area network Internet protocol address, and the source host's wide area network Internet protocol address in the mapping of source ports to Internet protocol addresses, and to record the end date and end time in the mapping of source ports to Internet protocol addresses responsive to the ending of the user session.

11. The product of claim 10, wherein at least one of the program instructions is performed by a router.

12. The product of claim 7, wherein the received data associated with a user session were obtained from a user session log recorded by a destination host computer.

13. A system for recognition of users by assigned source port blocks comprising:

a computer having a processor and memory operably connected to said processor;

first program instructions loaded into the memory and operable by the processor to search a mapping of source ports to Internet protocol addresses for one or more local area network Internet protocol addresses associated with a received wide area network Internet protocol address that were in use at a received date and time responsive to receiving data associated with a user session;

second program instructions loaded into the memory and operable by the processor to search a list of assigned source ports for a match between a set of source ports associated with the found local area network Internet protocol addresses and a received source port responsive to finding one or more local area network Internet protocol addresses associated with the received wide area network Internet protocol address that was in use of the received date and time; and third program instructions loaded into the memory and operable by the processor to identify a source host device that is assigned the matching local area network Internet protocol address responsive to finding a match between the set of source ports associated with the found local area network Internet protocol addresses and the received source port.

14. The system of claim 13, wherein the received data associated with a user session comprises a date, time, wide area network Internet protocol address, and source port.

15. The system of claim 13, wherein the mapping of source ports to Internet protocol addresses comprises list of user sessions, each having a start date, a start time, an end date, an end time, a local area network Internet protocol address, and a wide area network Internet protocol address.

16. The system of claim 13, further comprising program instructions loaded into the memory and operable by the processor to search the list of assigned source ports for a range of source ports assigned to the local area network Internet protocol address responsive to receiving traffic from a source host having a local area network Internet protocol address to initiate a user session, to assign a random source port from the range of source ports for use during the source host's user session responsive to finding a range of source ports assigned to the local area network Internet protocol address, to record the start date, start time, source host's local area network Internet protocol address, and the source host's wide area network Internet protocol address in the mapping of source ports to Internet protocol addresses, and to record the end date and end time in the mapping of source ports to Internet protocol addresses responsive to the ending of the user session.

17. The system of claim 16, wherein at least one of the program instructions is performed by a router.

18. The system of claim 13, wherein the received data associated with a user session were obtained from a user session log recorded by a destination host computer.

* * * * *